United States Patent [19]

Stoner

[11] 4,096,905
[45] Jun. 27, 1978

[54] METHOD OF INTRODUCING HARDENABLE MATERIAL INTO CONTAINING MEANS THEREFOR

[75] Inventor: Jesse A. Stoner, Scotia, N.Y.

[73] Assignee: General Electric Company, Fort Wayne, Ind.

[21] Appl. No.: 622,030

[22] Filed: Oct. 14, 1975

Related U.S. Application Data

[62] Division of Ser. No. 490,257, Jul. 22, 1974, Pat. No. 3,979,032, which is a division of Ser. No. 397,425, Sep. 14, 1973, Pat. No. 3,974,873.

[51] Int. Cl.$^2$ .............................................. B22D 19/04
[52] U.S. Cl. ..................................... 164/51; 164/130; 164/136
[58] Field of Search ................. 164/51, 130, 136, 251, 164/266, 335, 336, 337, 250, 155, 314; 222/146 HE, 590, 593

[56] References Cited

U.S. PATENT DOCUMENTS

| 2,122,233 | 6/1938 | Dunsheath | 164/337 X |
| 2,519,739 | 8/1950 | Butner | 164/336 X |
| 2,611,939 | 9/1952 | Kux | 164/336 X |

FOREIGN PATENT DOCUMENTS

| 475,874 | 8/1951 | Canada | 164/314 |
| 320,832 | 5/1957 | Switzerland | 164/155 |
| 445,731 | 2/1968 | Switzerland | 164/337 |
| 820,572 | 9/1959 | United Kingdom | 164/250 |

Primary Examiner—Francis S. Husar
Assistant Examiner—John McQuade
Attorney, Agent, or Firm—Joseph E. Papin

[57] ABSTRACT

Method for casting a metal. In this method, means is provided for casting the metal melted therein. Means for dispensing the metal to the casting means includes means for receiving a predetermined amount of the metal in its solid state, means for the passage of the metal from the receiving means, and means associated with the receiving means and operable generally for depositing the metal through the passage means into the casting means. Means is also provided for moving the casting means to a metal casting position when the metal therein is melted.

21 Claims, 6 Drawing Figures

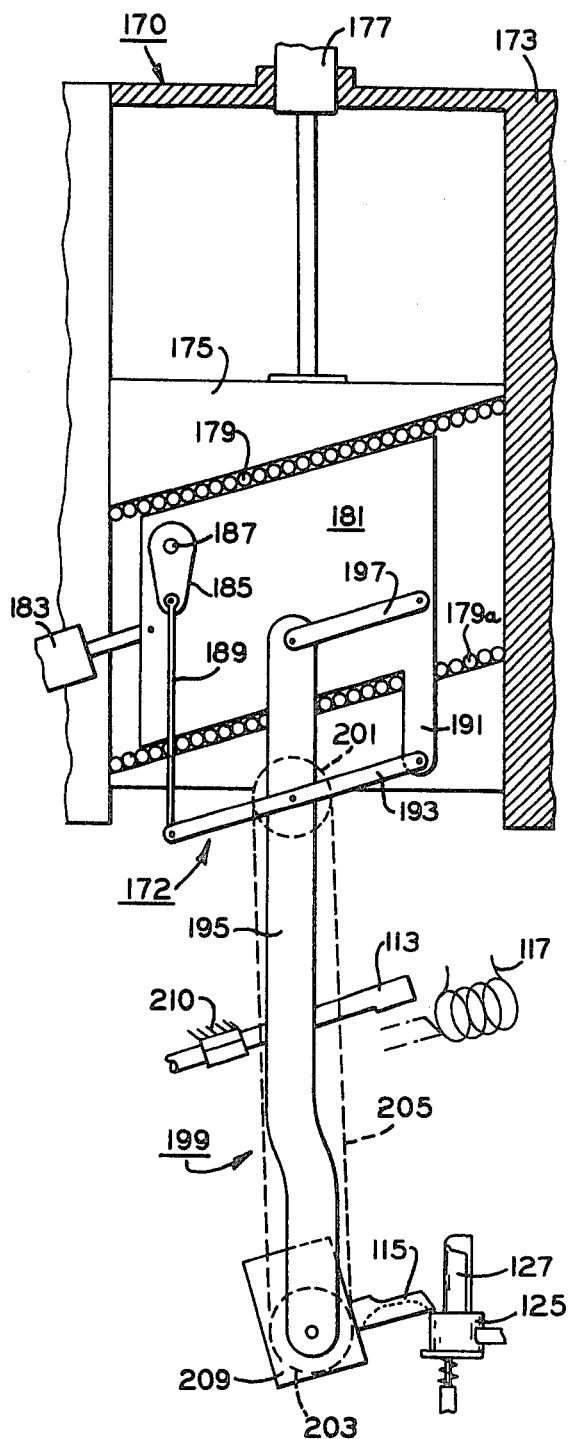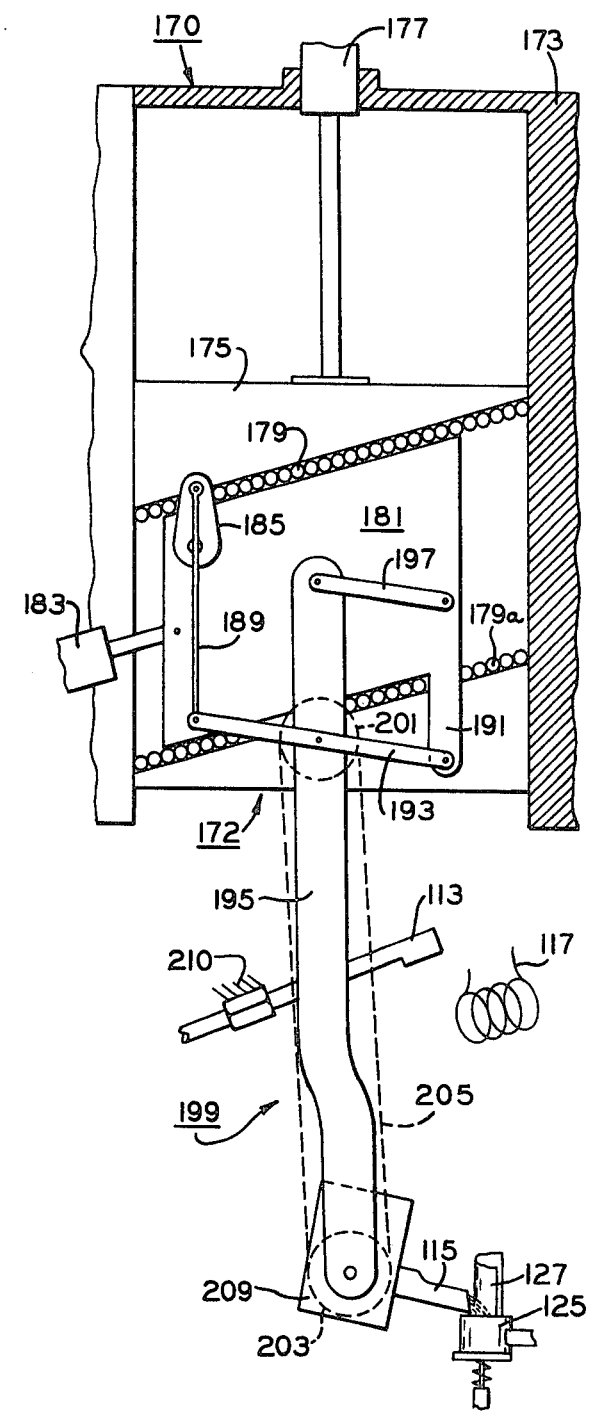
FIG. 3
FIG. 4

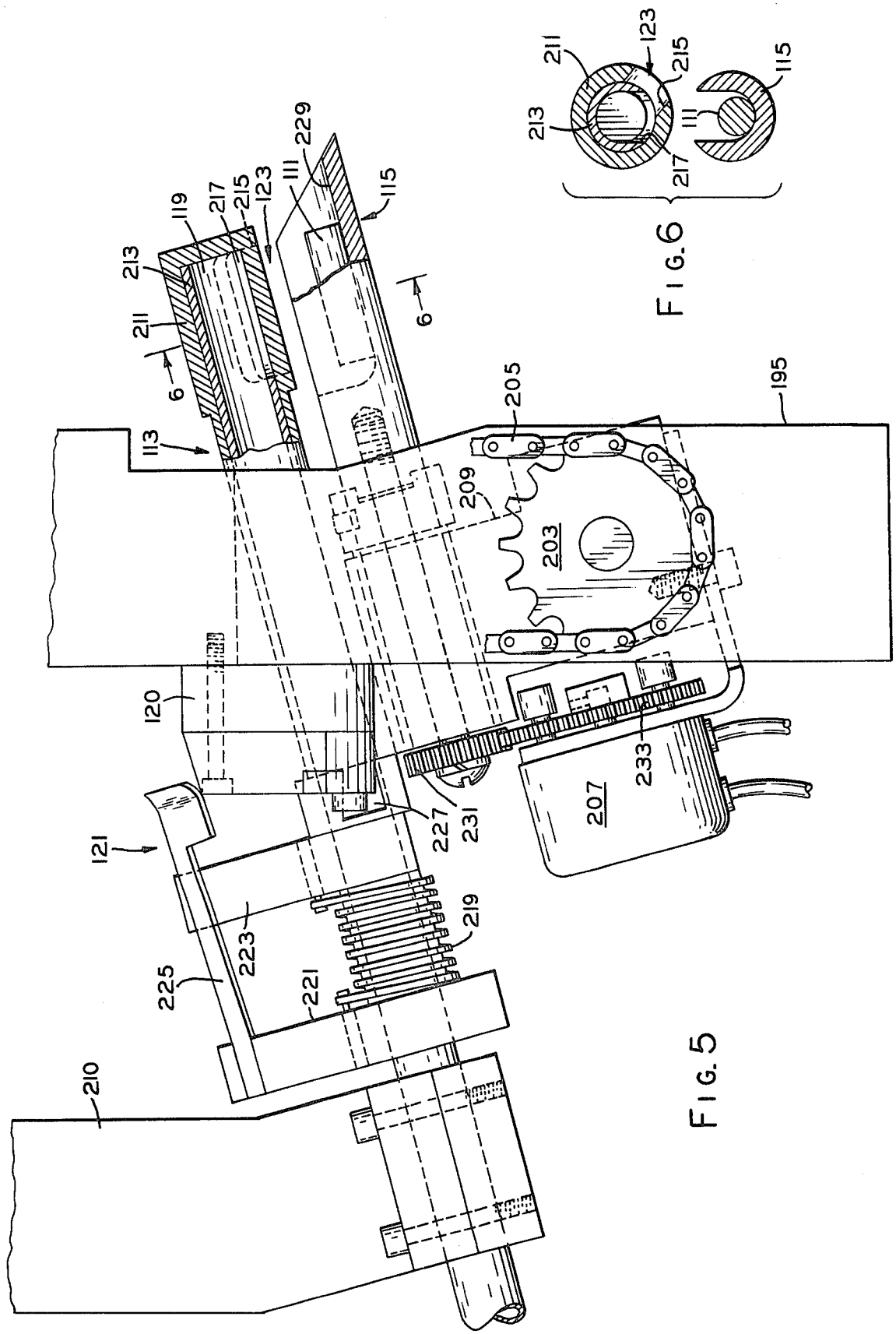

METHOD OF INTRODUCING HARDENABLE MATERIAL INTO CONTAINING MEANS THEREFOR

RELATED APPLICATIONS

This application for patent is a division of my copending application Ser. No. 490,257, filed July 22, 1974 (now U.S. Pat. No. 3,979,032 issued Sept. 7, 1976) and which application in turn is a division of my copending application Ser. No. 397,425, filed Sept. 14, 1973 (now U.S. Pat. No. 3,974,873 issued Aug. 17, 1976) which is specifically incorporated herein by reference.

FIELD OF THE INVENTION

The present invention relates generally to methods for introducing a hardenable material into means for containing it and in particular to such methods as may be employed to attach an end frame and another structural component of a dynamoelectric machine.

BACKGROUND OF THE INVENTION

In the manufacture of a dynamoelectric machine, it is necessary that a rotatable assembly thereof, such as a shaft and rotor for instance, be properly aligned both radially and axially with a cooperating stator or stationary assembly of the dynamoelectric machine. If radially misaligned, an eccentric air gap between the rotatable assembly and stator may result thereby to effect a non-uniform flux path with poor electrical efficiencies and the mechanical deficiency of vibration, and if axially misaligned, an undesirably great amount of axial rotor thrust is produced. Of course, it is also necessary that bearing means carried by an end frame construction of the dynamoelectric machine be aligned and in suitable journaling engagement with the rotatable assembly in order to provide proper longevity for such bearing means.

In the past, several different methods of assembling dynamoelectric machines have been utilized to effect the abovementioned proper radial and axial alignment of the rotatable assembly, stator and end frames of the dynamoelectric machine. For example, through-bolts have been used to interconnect the stator and end frames of a dynamoelectric machine with the rotatable assembly thereof journaled in the end frames; however, one of the disadvantageous or undesirable features of this construction is believed to be that rather close tolerances were required to attain proper alignment of the dynamoelectric machine components, and maintaining close tolerances manifestly results in increased machining and assembly costs of manufacture. Another past method of assembling dynamoelectric machines was to employ an oversized dummy rotatable assembly to effect the necessary alignment between the stator and end plate and thereafter substitute an actual rotatable assembly for the dummy rotatable assembly, however, one of the disadvantageous or undesirable features of this method of construction is believed to be that it was limited to "unit bearing" type machines wherein the rotatable assembly is supported in only one end frame. As a result, this method was unavailable for use in the greater majority of dynamoelectric machines wherein the rotatable assembly is supported in oppositely disposed end frames.

In U.S. Pat. No. 3,165,816 shims were disposed between the rotatable assembly and stator to effect proper radial alignment therebetween, and a rocker arm mechanism was employed to maintain the rotatable assembly and stator in their proper assembled positions while an adhesive such as a thermosetting resin, was applied to bond together the stator and opposite end plates in which the rotatable assembly was journaled.

In U.S. Pat. No. 3,705,994 another method of assembling dynamoelectric machines is disclosed wherein the opposite end frames thereof were welded to beams carried by the stator while the rotatable assembly was supported therein; however, one of the disadvantageous or undesirable features of this method is believed to be that the welds themselves, upon cooling, created stresses which tend to effect misalignment, as well known to the art.

In U.S. Pat. No. 2,892,225, there is disclosed a method of casting metal wherein molten metal in predetermined amounts are delivered directly from a source or furnace therefor to a casting ladle disposed adjacent to a mold, and the molten metal is then poured from the ladle into the mold. One of the disadvantageous or undesirable features of this past method of casting metal is believed to be that it was necessary not only to maintain the molten metal in the furnace at a predetermined temperature proper for the casting operations but it was also necessary to maintain such predetermined temperature of the molten metal as it was delivered from the source to the casting ladle. Since some metals, such as zinc, lead, aluminum or the like and various alloys thereof cool or solidify at a rather rapid rate, the time factor involved in delivering such molten metal from the source thereof to the casting ladle and casting it may, of course, be critical and relatively short.

The principle object of the present invention in one form thereof is to provide an improved method for introducing a hardenable material into means for containing it which overcomes the aforementioned disadvantageous or undesirable features of the past methods, and this, as well as other objects and advantageous features of the present invention, will be in part apparent and in part pointed out in the specification which follows.

SUMMARY OF THE INVENTION

In general, a method in one form of the invention is provided for introducing a hardenable means into means for containing it. This method comprises the steps of: introducing the hardenable material into the containing means from means for conveying the hardenable material at a position generally adjacent the containing means; and, moving the conveying means from its position generally adjacent the containing means toward another position generally adjacent a receptacle containing the hardenable material so as to receive therefrom additional hardenable material and actuating means associated with the receptacle for dispensing therefrom the additional hardenable material into the conveying means upon its movement toward its another position.

BRIEF DESCRIPTION OF THE DRAWINGS

FIGS. 1, 2, 3 and 4 are schematic views illustrating apparatus which may be used to practice a method in one form of the invention for introducing a hardenable material into means for containing it;

FIG. 5 is a side elevation, partially in cross-section of receiving, transferring and casting means of the apparatus of FIGS. 1-4; and FIG. 6 is a sectional view taken along line 6—6 of FIG. 5.

Corresponding reference characters indicate corresponding parts throughout the several views of the drawings.

Figure 1:
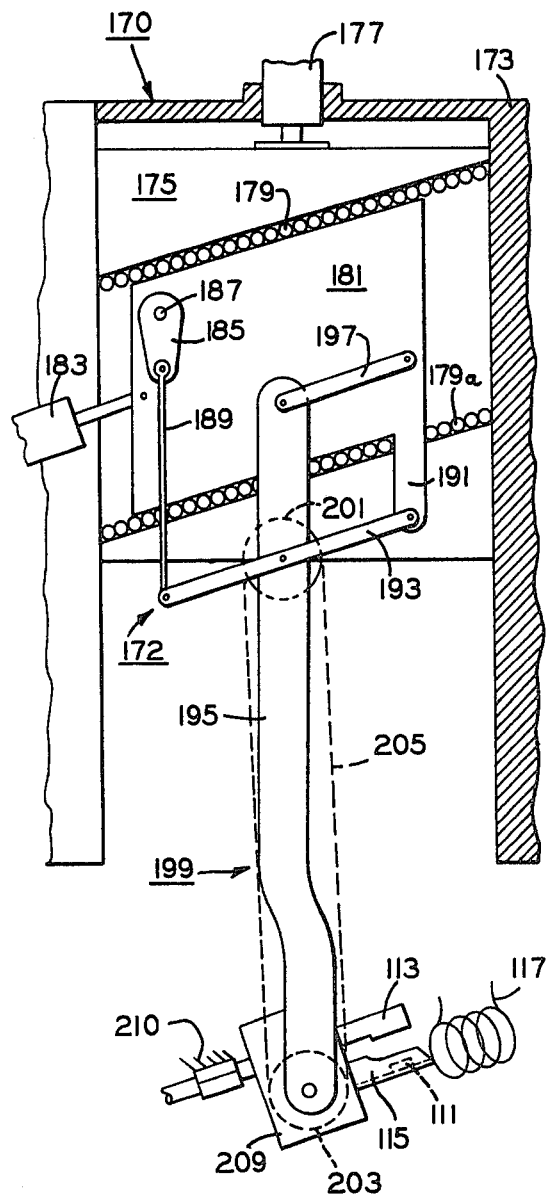

The following exemplifications set out herein illustrate the preferred embodiment of the invention in one form thereof, and such exemplifications are not to be construed as limiting in any manner the scope of the invention.

DETAILED DESCRIPTION OF THE PREFERRED EMBODIMENTS

Referring now to the drawings in general, there is illustrated in one form of the invention a method for introducing a hardenable material, such as for instance a metal in one form of the invention as may be comprised by a disc, cylindric pellet or other-shaped slug 111 of zinc, lead, aluminum or the like or various alloys thereof, into means for containing such hardenable material, such as a socket 125 (FIGS. 1–4). In this method, metal pellet 111 is supplied to a receptacle, such as a receiving means or transfer mechanism 113 (FIG. 5). Metal pellet 111 is then transferred in its solid state from receptacle 113 into means, such as a casting ladle 115, for conveying or casting the metal. Thereafter, metal pellet 111 is melted in conveying means or casting means 115 by suitable means well known in the art, such as an RF heater 117 or other heater or the like (FIG. 2), and the casting means is moved to a metal casting position (FIGS. 3 and 4).

Figure 2:
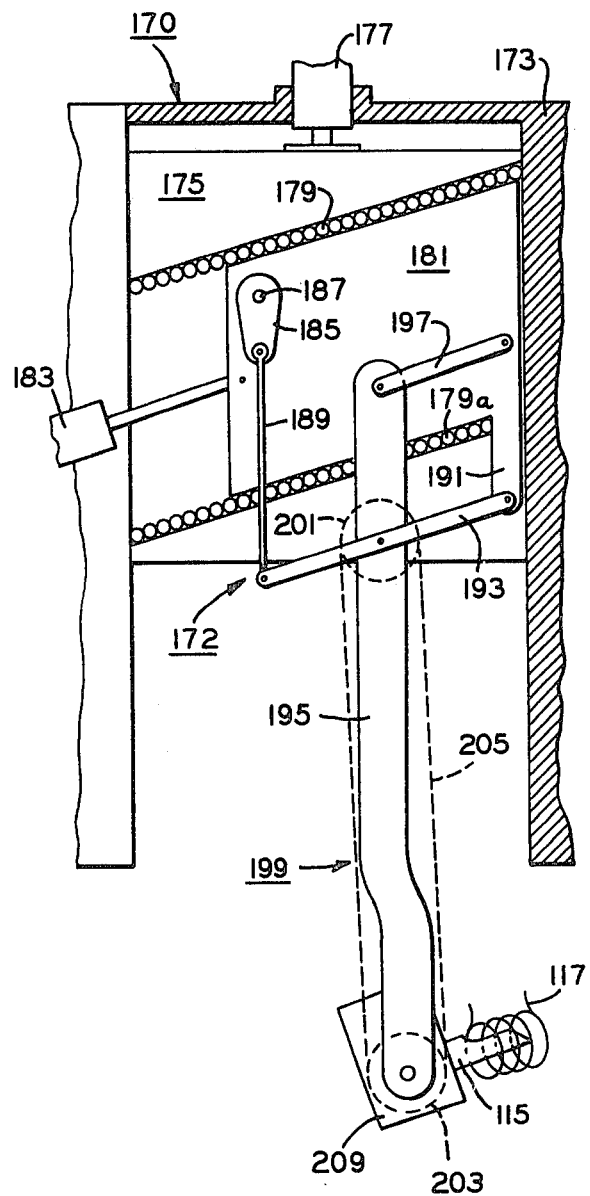

More particularly and with reference to FIGS. 1 and 5, pellet 111 of a predetermined volume or amount is supplied from a source thereof (not shown) into a chamber 119 of receptacle 113. Upon upward movement of ladle 115 toward receptacle 113, a wiping block or abutment 120 wipes or engages a trigger mechanism 121 to cock, trigger or actuate it thereby to open means, such as an opening or passage 123 in the receptacle 113, for transferring or dispensing pellet 111 to effect the passage from chamber 119 into the ladle. With pellet 111 transferred in its solid state from chamber 119 of receptacle 113 to ladle 115, the ladle is moved so as to enter RF heater 117, as shown in FIG. 2, and the metal is thereby melted being transformed to its liquid or molten state for subsequent casting. Ladle 115 is them removed from RF heater 117 and further moved downwardly to a casting position juxtaposed with means, such as a socket 125 or the like in an end frame or other structural member of a dynamoelectric machine for instance, for containing or receiving molten metal 111 from ladel 115, as shown in FIG. 3. In its casting position, ladle 115 is then tipped or pivotally moved about an axis thereof, as shown in FIG. 4, casting or pouring molten metal 111 into socket 125 for solidification thereby to establish a rigid connection between at least a part of the socket and another structural component, such as a beam 127 or the like of a dynamoelectric machine, which is disposed in assembled position within the socket.

Referring now again in general to the drawings, there is shown apparatus 170 having means, such as a ladle 115, for casting metal melted therein (FIG. 1). Means for transferring or dispensing the metal to ladle 115 generally comprises means, such as receptacle 113, for receiving a predetermined amount of metal in a solid state, means, such as opening 123, for the passage of the entire amount of the metal into casting means or ladle 115, and means, such as a tube 211 or the like discussed hereinafter, associated with the receptacle and operable generally for depositing or dispensing the metal through the opening into the ladle (FIG. 5). Means, such as a linkage assembly indicated generally at 172, is provided for moving the casting means to a metal casting position when the metal therein is melted (FIGS. 3 and 4).

More particularly, a housing 173 is provided in which a movable means, such as a block or guide 175, is adapted to be reciprocably movable generally vertically by suitable means, such as a double-acting air cylinder 177 or the like, for actuating guide 175, as shown in FIGS. 1–4. Conveyor means, such as parallel runs or races of rollers or bearings 179, 179a are provided in guide 175 extending therethrough at a predetermined angle, and another movable means, such as a shuttle or block 181, is reciprocably movable generally horizontally with respect to the guide on rollers 179, 179a by suitable means, such as another double-acting air cylinder 183 or the like, for actuating the shuttle block.

Linkage assembly or linking means 172 comprises a crank 185 which has one end rotatably connected at 187 to shuttle 181 while a side linkage or arm 189 is pivotably connected with the other end of the crank, and another side linkage or arm 191, which is generally parallel to link 189, extends integrally from the lower end of shuttle 181. A cross-link 193 is pivotally interconnected between the distal ends of side links 189, 191, and a support arm 195 for ladle 115 is pivotally mounted on the cross-link adjacent the mid-portion thereof. A connecting link 197 is pivotally connected between the upper end of support arm 195 and the mid-portion of side link 191 being generally parallel with cross-link 193. A sprocket and chain drive means, indicated generally at 199, for driving ladle 115 is provided with upper and lower sprockets 201, 203 rotatably mounted on support arm 195, and a drive chain 205 is connected or run about the sprockets, the upper sprocket being drivenly connected with cross-link 193 and rotatable therewith about support arm 195.

Referring now also to FIGS. 5 and 6, ladle 115 and a rotary solenoid 207 for effecting inversion thereof, as discussed hereinafter, are carried on a support or mounting means 209 which is interconnected by suitable means (not shown) for pivotal movement with lower sprocket 203, i.e., for conjoint rotation therewith.

Another tube 213, which is generally included in receptacle 113, is mounted on a stationary member or part 210 and is generally concentric with tube 211, and metal pellet 111 is supplied through tube 213 for entry into pellet chamber 119 therein. A pair of slots 215, 217 are respectively provided in tubes 211, 213 and are, in the at-rest position of the tubes, angularly displaced from each other thereby to close pellet chamber 119 preventing the transfer or passage of any pellet 111 therefrom, the slots 215, 217 generally constituting opening 123. Trigger mechanism 121 is provided with a torsion spring 219 engaged between a pair of stationary and rotatable posts 221, 223, and a resilient locking member or trip 225 is disposed on the stationary post in locking or displacement preventing engagement with the rotary post. Outer concentric tube 211 is drivenly connected for conjoint rotation with rotatable post 223 upon wiping engagement of trip 225 with support arm abutment or wiping block 120, and a cocking lever 227 is integrally formed with the rotatable post for engagement with the wiping block upon downward movement thereof to return or rerotate the rotatable post to its original position in locking engagement with the trip after pellet 111 has been delivered to the ladle, as discussed hereinafter.

Ladle 115 is rotatably supported in its mounting means 209, and a recess portion or spout 229, into which pellet 111 is deposited, is provided in the rightward end of the ladle. To complete the description of casting apparatus 170, a gear 231 is drivingly connected to ladle 115 on its leftward end for effecting rotation thereof to empty any residue of metal which may remain in spout 229 subsequent to the casting operation, as discussed hereinafter, and another gear 233 carried by rotary solenoid 207 is drivingly meshed with ladle gear 231.

In the operation, assume that guide 175 is moved upwardly by its actuator 177, as shown in FIG. 1, so that ladle 115 is conjointly moved upwardly therewith into juxtaposition with receptacle 113. Upon such conjoint upward movement, wiping block 120 engages and moves trip 225 to a position displaced from rotatable post 223 permitting the force of torsion spring 219 to effect concerted rotation of the rotatable post and outer concentric tube 211, FIG. 5. Upon rotation of tube 211, slot 215 therein is brought into registry with slot 217 of inner-concentric tube 213 thereby to establish or open opening 123, and metal pellet 111 which had been supplied into chamber 119 is transferred by gravity therefrom dropping or passing through the opening into spout 229 of ladle 115, FIG. 6. As shown in FIG. 2, shuttle actuator 183 thereafter moves shuttle 181 rightwardly on roller runs 179, 179a to an end position, and ladle 115 is conjointly movable with the shuttle toward a position entered into RF heater 117 thereby to heat metal pellet 111 in ladle spout 229 for changing the state thereof from solid to molten. After the change of state of metal pellet 111 occurs, shuttle actuator 183 retracts or removes shuttle 181 to the position shown in FIG. 1, and guide actuator 177 thereafter moves guide 175 downwardly in housing 173 to the position shown in FIG. 3 wherein ladle 115 with molten metal 111 therein is disposed in a preselected orientation or attitude juxtaposed with socket 125. As shown in FIG. 4, crank 185 is turned by suitable means (not shown) approximately 180° to actuate linkage assembly 172 which raises support arm 195 causing conjoint upward movement of ladle 115 therewith relative to socket 125; however, the actuation of linkage assembly 172 to raise support arm 195 also effects rotation of upper sprocket 201 to drive chain 205 and conjointly rotate lower sprocket 203. Since ladle mount 209 is rotatably driven by lower sprocket 203, ladle 115 is tipped or pivoted from its preselected orientation in its casting position whereby molten metal 111 is poured or cast from ladle spout 229 into socket 125 for solidification therein to establish a rigid connection between the socket and beam 127 therein. It may be noted that since beam 127 is generally U-shaped in cross-section, a passage is thereby provided through which at least a portion of the molten metal is poured during the casting operation, as described above, and ladle 115 is moved into juxtaposition relative to the beam and socket to effect the pouring of the molten metal through the beam passage into the socket.

After the casting operation, crank 185 is returned to its original position which drives linkage assembly 172 to its original position, and upon the return of the linkage assembly to its original position, sprocket and chain drive 199 is reversely driven thereby to its original position which effects the pivoting of ladle mount 209 to its original position and its preselected orientation. At the same time, guide actuator 177 moves guide 175 upwardly in housing 173 to its original position with ladle 115 in its preselected orientation wherein apparatus 170 is disposed as shown in FIG. 1. To complete the description of the operation, rotary solenoid 207 is energized driving meshed gears 233, 231 to effect rotation of ladle 115 in its mount 209 to another preselected orientation or an inverted position for emptying any metal residue from ladle spout 229 which may remain therein after the casting operation, and in this manner, the ladle is cleansed in preparation of receiving another metal pellet or slug 111 during the next cycle of casting apparatus 170.

Although only one apparatus 170 has been described hereinabove along with its casting operation, it is apparent that a plurality of such apparatus can be employed for simultaneously casting in place other beams 127 within other sockets 128 of the end frame.

In view of the foregoing, it is now apparent that a novel method for introducing a hardenable material into means for containing it is provided by way of illustration meeting all of the objects and advantageous features set forth hereinabove, as well as others, and that changes in the particular arrangements, shapes and details as well as variances in the steps of such novel method may be made by those having ordinary skill in the art without departing from the spirit of the invention and the scope thereof, as set out in the claims which follow.

I claim:

1. A method of casting a metal into means for containing it comprising the steps of:
   (a) supplying the metal in its solid state to a receptacle therefor;
   (b) transferring the metal in its solid state from the receptacle into means for casting the metal disposed in a first position generally adjacent the receptacle;
   (c) displacing the casting means with the metal in its solid state therein from the first position to a second position for heating the metal and melting the metal in the casting means at the second position;
   (d) moving the casting means from the second position to a position generally adjacent the containing means for casting the molten metal from the casting means into the containing means; and
   (e) casting the metal from the casting means into the containing means.

2. The method as set forth in claim 1 comprising the additional step of emptying any residue of the metal from the casting means subsequent to the casting step.

3. The method as set forth in claim 1 wherein the transferring step includes actuating means associated with the receptacle for dispensing the metal in its solid state from the receptacle into the casting means.

4. The method as set forth in claim 1 comprising the additional step of returning the casting means from its casting position toward the first position and engaging means associated with the casting means with actuating means associated with the receptacle so as to effect the dispensing of the metal in its solid state therefrom into the casting means thereby to effect the transferring step.

5. A method of introducing a hardenable material into means for containing it comprising the steps of:
   (a) transferring a predetermined amount of the material in its hardened state through a passage therefor in means for receiving the material into means for conveying it toward a position generally adjacent the containing means;
(b) melting the material in the conveying means and moving it toward its adjacent position;
(c) actuating the conveying means in its adjacent position to introduce the material in its melted state into the containing means; and
(d) displacing the conveying means away from its adjacent position toward the receiving means and positioning the conveying means to generally empty therefrom any residue of the material subsequent to the actuating step during such displacement movement from the containing means toward the receiving means.

6. The method as set forth in claim 5 wherein the positioning and displacing step comprises inverting the conveying means.

7. The method as set forth in claim 5 wherein the positioning and displacing step comprises rotating the conveying means toward a generally inverted position.

8. A method of introducing a hardenable material into means for containing it comprising the steps of:
(a) providing a preselected amount of the hardenable material in means for conveying it toward a position generally adjacent the containing means;
(b) moving the conveying means toward its adjacent position;
(c) simultaneously rotating a first means adapted for selective rotation, driving a second means in response to the rotation of the first means with the second means being operably connected between the first means and a third means for conjoint rotation with the first means, and rotating the third means in response to the driven operation of the second means, the third means being connected with the conveying means so as to effect tilting thereof upon the rotating of the third means thereby to introduce the hardenable material into the containing means; and
(d) flowing the hardenable material in the containing means so as to form a rigid connection therewith upon the hardening of the hardenable material.

9. The method as set forth in claim 8, wherein the first and third means comprise a pair of sprockets, and the second means comprises a chain drive for the sprockets.

10. A method of casting a metal comprising the steps of:
(a) supplying the metal in its solid state to means for casting it;
(b) moving a pair of movable means adapted for conjoint and relative movement with respect to each other and thereby disposing the casting means successively in a position for melting the metal therein and another position for casting the metal in response to the conjoint movement and relative movement of the movable means pair, respectively, the casting means being mounted to at least one of the movable means; and
(c) actuating means associated with the at least one movable means and operable generally for tipping the casting means in its position so as to cast the metal therefrom.

11. A method of casting a metal comprising the steps of:
(a) supplying the metal in its solid state to means for casting it when the casting means is disposed in a metal receiving position;

(b) moving the casting means from its metal receiving position toward a metal melting position in association with means for melting the metal in the casting means;
(c) further moving the casting means with the molten metal therein toward a position for casting the molten metal generally adjacent means for containing the molten metal;
(d) tipping the casting means in its casting position to cast the molten metal therefrom into the containing means; and
(e) positioning the casting means so as to remove therefrom any residue of the metal and returning the casting means to its metal receiving position.

12. A method of introducing a hardenable material into means for containing it, the method comprising the steps of:
(a) moving means for conveying the hardenable material from one orientation at one position generally adjacent the containing means so as to effect the introduction of the hardenable material from the conveying means into the containing means and returning the conveying means to the one orientation at the one position; and
(b) displacing the conveying means in the one orientation thereof from the one position toward another position generally adjacent a receptacle containing the hardenable material so as to receive therefrom additional hardenable material and actuating means associated with the receptacle for dispensing therefrom the additional hardenable material into the conveying means upon its movement toward its another position, the conveying means being positioned prior to the actuation of the dispensing means so as to empty from the conveying means any residue of the hardenable material which may remain in the conveying means.

13. The method as set forth in claim 12 wherein the displacing and actuating step includes triggering the dispensing means toward a displaced position with respect to the receptacle thereby to effect the passage therefrom of the additional hardenable material into the conveying means.

14. The method as set forth in claim 12 wherein the receptacle includes means for the passage therefrom of the additional hardenable material into the conveying means, and wherein the displacing and actuating step includes triggering the dispensing means with respect to the receptacle toward a position opening the passage means to effect the passage therethrough of the additional hardenable material.

15. The method as set forth in claim 12 wherein the displacing and actuating step comprises rotating the conveying means to effect the emptying therefrom of the residue of hardenable material which may remain in the conveying means.

16. The method as set forth in claim 12 wherein the displacing and actuating step includes moving the conveying means from the one orientation thereof so as to empty therefrom any residue of the hardenable material which may have remained in the conveying means subsequent to the introduction of the hardenable material into the containing means during the moving and returning step and prior to the actuation of the dispensing means during the displacing and actuating step.

17. The method as set forth in claim 12 wherein the displacing and actuating step includes transporting the conveying means in a generally linear direction through a preselected distance between the one position and the another position.

18. The method as set forth in claim 12 wherein the displacing and actuating step includes engaging abutment means on said conveying means with the dispensing means to effect the displacement of the additional hardenable material from the receptacle into the conveying means.

19. A method of introducing a hardenable material into means for containing it, the method comprising the steps of:
 (a) introducing the hardenable material into the containing means from means for conveying the hardenable material;
 (b) moving the conveying means from the containing means toward a receptacle containing the hardenable material and generally positioning the conveying means so as to empty any residue of the hardenable material which may remain therein subsequent to the introducing step; and
 (c) actuating means associated with the receptacle for dispensing therefrom additional hardenable material into the conveying means when the containing means is disposed at least adjacent the receptacle in response to the movement of the containing means toward the receptacle during the moving and positioning step.

20. The method as set forth in claim 19 wherein the actuating step comprises engaging an abutment associated with the conveying means with the dispensing means so as to effect the passage of the additional hardenable material from the receptacle into the conveying means.

21. The method as set forth in claim 19 comprising the additional step of moving the conveying means with the additional hardenable material therein away from the receptacle for effecting the introduction of the additional hardenable material into another means for containing it.

* * * * *

UNITED STATES PATENT AND TRADEMARK OFFICE
CERTIFICATE OF CORRECTION

PATENT NO. : 4,096,905

DATED : June 27, 1978

INVENTOR(S) : Jesse A. Stoner

It is certified that error appears in the above-identified patent and that said Letters Patent are hereby corrected as shown below:

```
Col. 1,  line 42, delete "abovementioned" and insert
                  --above-mentioned--;
         line 58, delete "," (first occurrence) and insert
                  --;-- (semicolon).
Col. 3,  line 41, after "passage" insert --thereof--;
         line 46, delete "them" and insert --then--.
Col. 7,  line 62, after "its" insert --another--.
```

Signed and Sealed this

Seventh Day of November 1978

[SEAL]

Attest:

RUTH C. MASON
*Attesting Officer*

DONALD W. BANNER
*Commissioner of Patents and Trademarks*